United States Patent Office
3,065,261
Patented Nov. 20, 1962

3,065,261
PHARMACEUTICAL SALTS
Verlin C. Stephens, Indianapolis, Ind., assignor to Eli Lilly and Company, Indianapolis, Ind., a corporation of Indiana
No Drawing. Filed Dec. 14, 1960, Ser. No. 75,670
5 Claims. (Cl. 260—490)

This invention relates to improved analgesic and antitussive compounds, and more particularly to novel salts of certain 1,2-diphenyl-2-acyloxy-3-methyl-n-butylamine compounds.

The base compounds employed in preparing the compositions of the invention are represented by the following formula:

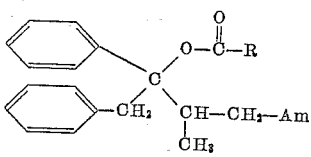

wherein R is a methyl or ethyl radical and Am is a radical of the class consisting of dimethylamino, dimethylamino-N-oxide, pyrrolidino, and pyrrolidino-N-oxide. These compounds possess two centers of asymmetry, and therefore occur in diastereoisomeric forms. In accordance with conventional practice, the less soluble diastereoisomers are designated as the $\alpha$ isomers, and the more soluble as the $\beta$ isomers. The present invention is concerned only with the $\alpha$ isomers, since it has been found that the $\beta$ isomers have little or no pharmaceutical activity. The $\alpha$-$l$ compounds are excellent antitussives, and the $\alpha$-$d$ compounds are analgesics of outstanding usefulness, having no tendency to produce addiction.

The base compounds have a characteristic, intensely bitter flavor, which gives rise to problems in preparing them for use by oral administration. The flavor is a particularly severe problem in preparing the compounds for use in the form of suspensions.

It is therefore an object of the present invention to prepare compounds of the designated class in the form of derivatives having improved taste characteristics.

Another object is to convert the base compounds into derivatives yielding suspensions having an attractive taste when the said derivatives are incorporated into a suitable vehicle.

Another object is to prepare analgesic and antitussive suspensions having superior taste properties and pharmaceutical effectiveness.

Other objects of the invention will be apparent from the following description.

The new compositions of the present invention are the 2-naphthalenesulfonate salts of the base compounds represented by the above structural formula. These salts are stable materials having very low solubility in water and markedly decreased taste intensity. They have essentially the same pharmaceutical activity as the parent substances and the same substantial freedom from side effects. They can be utilized for therapeutic purposes by the usual routes, such as by parenteral administration in the form of a suspension in water or other acceptable pharmaceutical extending medium, by oral administration in tablets, capsules, or the like, or as a suspension in an appropriate vehicle, the latter being a pharmaceutical form to which the present compounds are especially adapted.

Among the new compositions of the present invention are the following:

$\alpha$-$l$-1,2-diphenyl-2-propionoxy-3-methyl - 4 - dimethylaminobutane 2-naphthalenesulfonate, $\alpha$-$d$-1,2-diphenyl-2-propionoxy-3-methyl - 4 - dimethylamino butane 2-naphthalenesulfonate, $\alpha$-$l$-1,2-diphenyl-2-propionoxy-3-methyl - 4 - dimethylaminobutane-N-oxide 2-naphthalenesulfonate, $\alpha$-$d$-1,2-diphenyl-2-propionoxy-3-methyl-4-dimethylaminobutane-N-oxide 2-naphthalenesulfonate, $\alpha$-$l$-1,2-diphenyl-2-acetoxy- 3 -methyl - 4 - dimethylaminobutane 2-naphthalenesulfonate, $\alpha$-$d$-1,2-diphenyl-2-propionoxy-3-methyl - 4 - pyrrolidinobutane 2-naphthalenesulfonate, $\alpha$-$l$-1,2-diphenyl-2-acetoxy-3-methyl - 4 - pyrrolidinobutane-N-oxide 2-naphthalenesulfonate, and the like.

The new compounds are readily prepared by dissolving the base compound and a slight molar excess of 2-naphthalenesulfonic acid in an inert mutual solvent at elevated temperature, filtering to remove any undissolved material, and cooling, whereupon the desired 2-naphthalenesulfonate salt of the base compound crystallizes in good yield and can be separated from the reaction mixture by filtration or the like. The solvent is suitably an aqueous solution of a water-miscible alcohol, such as aqueous ethanol containing from about 25 to about 50 percent by volume of the alcohol. Other solvents are readily ascertainable from the art, the solubility characteristics of the reactants being well known. The solid reaction product is washed, if desired, to remove any occluded starting materials, and may optionally be recrystallized.

In an alternative procedure, the base compound in the form of a hydrohalide or other strong acid salt is reacted at elevated temperature in an inert mutual solvent with a 2-naphthalenesulfonic acid salt, and the reaction mixture is cooled to crystallize the desired product. The 2-naphthalenesulfonic acid salt can suitably be the sodium, potassium, calcium, or other soluble alkali-metal or alkaline-earth metal salt. The solvent can be aqueous ethanol or other inert mutual solvent as noted above. The by-product salt resulting from the reaction (e.g., sodium chloride) is largely left behind in the liquid phase when an aqueous solvent is employed. The solid reaction product, after separation from the liquid phase, is washed with water to remove any occluded starting material and by-product salt, and then is recrystallized if desired from aqueous alcohol.

In a further alternative procedure, the base compound in the form of a strong acid salt is reacted in aqueous solution with 2-naphthalenesulfonic acid itself, and the desired 2-naphthalenesulfonate salt of the base compound precipitates therefrom.

The product compounds of the present invention are readily prepared in an aqueous suspension suitable for pediatric and general use by homogenizing with an aqueous vehicle of conventional type containing a suspending agent, a sweetening agent, and a flavoring material. In such suspensions, it is found that the taste of the medicament is minimized by incorporating therein a pharmaceutically acceptable 2-naphthalenesulfonate salt, e.g., sodium 2-naphthalenesulfonate or other alkali-metal or alkaline-earth-metal 2-naphthalenesulfonate. Taste improvement is observed even with very low proportions of such added salt, and the effect is increased at proportions up to the saturation level. It is generally preferred to add the salt in a proportion between about 1 and about 3 percent by weight of the total suspension.

In the preparation of the new compounds and of the suspensions thereof, it is of course important to employ a grade of 2-naphthalenesulfonic acid or its salts having essentially no pharmaceutically objectionable impurities and particularly having no impurities with objectionable taste properties. To this end, it is generally desirable to purify the technical grade of sodium 2-naphthalenesulfonate which is commercially available. Such purification can be accomplished by a procedure exemplified as follows: Technical-grade material (400 g.) is dissolved in 8 liters of distilled water at room temperature. The solution is slurried with 80 g. of activated carbon at room temperature, stirred for several minutes, and filtered. To the filtrate is added sodium chloride (800 g.), and the mixture is heated to boiling, a small additional quantity of water being added as necessary to produce a clear solution. The solution is filtered while hot through a filter candle, then allowed to cool to room temperature. Purified sodium 2-naphthalenesulfonate crystallizes from the solution during the cooling operation, and is separated by filtration. The separated crystals are washed once with a minimum quantity of ice water, then dried.

The 1,2 - diphenyl - 2 - acyloxy - 3 - methyl - n-butylamine compounds employed as starting materials in the present invention can be prepared by the method described in U.S. Patent 2,728,779, Pohland, which issued December 27, 1955.

The N-oxides thereof are readily prepared by dissolving the parent compound in a suitable solvent, such as methanol or acetic acid, and reacting with an oxidizing agent, such as benzoyl peroxide, ozone, neutral Caro's acid or hydrogen peroxide. The N-oxide derivatives formed thereby are isolated by crystallization from the solvent employed, and are obtained in the form of white, crystalline solids generally containing one or more molecules of solvent of crystallization (e.g., water or alcohol).

The $\alpha$-$l$ and the $\alpha$-$d$ isomers of the base compounds of the present invention can be obtained in a variety of ways. The synthesis described in U.S. Patent 2,728,779, referred to above, produces the $dl$ racemic mixture as the primary product. This mixture is separated into the $\alpha$ and $\beta$ components by fractional crystallization from aqueous ethanol, the $\alpha$ fraction being the less soluble. The $\alpha$ fraction can then be resolved, suitably by reaction with an optically active acid, such as dibenzoyl-$l$-tartaric acid, dibenzoyl-$d$-tartaric acid, $d$-camphorsulfonic acid, $l$-camphorsulfonic acid, or the like to form diastereoisomeric salts, which are also separable by fractional crystallization. The salt fractions can be decomposed separately to yield the individual $\alpha$-$l$ and $\alpha$-$d$ isomers of the base compound.

While the foregoing represents an effective way to obtain the base compounds of the present invention in optically active form, a preferred method involves a preliminary resolution of the 3-amino-2-methylpropiophenone,

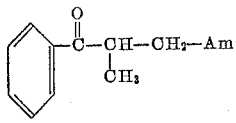

employed in the synthesis of the base compound. Such resolution can readily be effected by dissolving the ketone in a suitable solvent and reacting with an optically active acid such as dibenzoyl-$d$-tartaric acid. The $d,d$ diastereoisomeric salt formed thereby precipitates from solution and is withdrawn. The $l$ isomer of the ketone remaining in solution readily racemizes at elevated temperature and can then be reacted with a further quantity of the optically active acid, so that complete conversion to the $d,d$ diastereoisomer can ultimately be achieved. The withdrawn $d,d$ diastereoisomer is decomposed with ammonium hydroxide to separate the pure $d$-isomer. The latter, when reacted with benzyl magnesium halide, then esterified with propionic anhydride, produces largely the $\alpha$-$l$ isomer of the desired base compound, in admixture with a small proportion (10–20 percent) of a $\beta$ diastereoisomer, which can be readily separated by virtue of their difference in solubility, the $\alpha$-$l$ isomer being relatively insoluble in water.

The invention will be more fully comprehended from the following specific examples. It is to be understood that the examples are illustrative only, and are not intended by way of limitation upon the scope of the invention.

EXAMPLE 1

$\alpha$ - $l$ - 1,2 - diphenyl-2-propionoxy-3-methyl-4-dimethylaminobutane hydrochloride (26.25 g., 0.07 mole) and purified sodium 2-naphthalenesulfonate (17.75 g., 0.077 mole) are commingled with 70 ml. of ethanol and 100 ml. of distilled water and heated until substantially completely dissolved. The solution is filtered hot to remove any undissolved material, and is then cooled to about 0° C. The $\alpha$ - $l$-1,2-diphenyl-2-propionoxy-3-methyl-4-dimethylaminobutane 2-naphthalenesulfonate salt crystallizes during the cooling operation, and is separated by filtration. The filtration solids are washed several times with water, and are recrystallized by again dissolving in hot 70:100 ethanol-water, filtering, and cooling. The recrystallized material is washed several times with water, then dried in air at ordinary temperatures. The yield is about 38 g., or 96 percent of theory. The product obtained in this way is the monohydrate, a white crystalline material melting at 108–113° C. and having a solubility in water of 0.15 gram per 100 ml. at 20° C. Upon recrystallization from benzene, it is obtained in anhydrous form, melting at 162–165° C.

EXAMPLE 2

$\alpha$ - $d$ - 1,2-diphenyl-2-propionoxy-3-methyl-4-dimethylaminobutane hydrochloride is converted into the 2-naphthalenesulfonate salt derivative according to the procedure of Example 1. The product is a white crystalline material having the same melting point as the $\alpha$-$l$ isomer.

EXAMPLE 3

$\alpha$ - $l$ - 1,2 - diphenyl-2-propionoxy-3-methyl-4-dimethylaminobutane-N-oxide hydrochloride (58.65 g.) and purified sodium 2-naphthalenesulfonate (37.5 g.) are commingled with 175 ml. of ethanol and 150 ml. of distilled water and heated until substantially completely dissolved. The solution is filtered hot to remove any undissolved material. Distilled water (50 ml.) is then added, whereupon $\alpha$-$l$-1,2-diphenyl-2-propionoxy-3-methyl-4-dimethylaminobutane-N-oxide 2-naphthalenesulfonate separates by crystallization, and is filtered off. The filtration solids are washed with water, recrystallized from 70:100 ethanol-water, and dried. The yield is 81 g., corresponding to 95 percent of theory. The product is a white, crystalline, anhydrous material melting at 169–171° C. and containing 60.6 percent by weight of the base compound.

EXAMPLE 4

An antitussive aqueous suspension containing 10.2 mg./ml. of $\alpha$-$l$-1,2-diphenyl-2-propionoxy-3-methyl-4-dimethylaminobutane 2-naphthalenesulfonate, calculated as the base compound, is prepared according to the following procedure. The suspension has the following composition:

*Part I*

| | |
|---|---|
| Sodium 2-naphthalenesulfonate _____g__ | 10.0 |
| Citric acid _____g__ | 4.25 |
| Sodium cyclamate _____g__ | 10.0 |
| Saccharin, soluble _____g__ | 2.0 |
| Water, distilled _____ml__ | 500 |

*Part II*

| | |
|---|---|
| Methyl cellulose, 1500 cp. at 2% _____g__ | 3.0 |
| Methyl cellulose, 4000 cp. at 2% _____g__ | 4.5 |

*Part III*

| | |
|---|---|
| Sucrose _____g__ | 450 |

*Part IV*

| | |
|---|---|
| Glucose _____g__ | 150.0 |

Part V

α-l-1,2-diphenyl-2-propionoxy-3-methyl-4-dimethylaminobutane 2-naphthalenesulfonate _____g__ 17.0

Part VI

Silicone emulsion, 30 percent _____g__ 3.3
Water, distilled _____ml__ 25.0

Part VII

F.D. and C. Red No. 2 _____g__ 0.050
F.D. and C. Red No. 1 _____g__ 0.050
Water, distilled _____ml__ 10.0

Part VIII

Cherry flavor, imitation _____ml__ 2.0
Cherry pit flavor, imitation _____ml__ 0.5

Part IX

Ethanol, 95 percent _____ml__ 10.5
Methyl parahydroxybenzoate _____g__ 0.3
Propyl parahydroxybenzoate _____g__ 0.15
Butyl parahydroxybenzoate _____g__ 0.15
Oil of peppermint _____ml__ 0.1

Part X

Water, distilled, q.s. to 1000.0 ml.

Part I is mixed, dissolved, and heated to 90° C. Part II is added and mixed well with the solution, and the mixture is stirred while cooling to 30° C. to effect complete solution. Parts III and IV are successively added and dissolved. Part V is added in the form of a finely divided powder and mixed well for 10 minutes. Parts VI, VII, VIII, and IX are successively added and mixed well, after which distilled water (Part X) is added in a quantity sufficient to adjust the volume to 1000 ml. The final mixture is homogenized.

The completed product has a pleasant cherry flavor of excellent acceptability in taste-panel tests.

EXAMPLE 5

An analgesic aqueous suspension of α-d-1,2-diphenyl-2-propionoxy-3-methyl-4-dimethylaminobutane 2-naphthalenesulfonate containing 6.0 mg./ml. of the base compound, expressed as the hydrochloride of the base compound, is prepared using the proportions and procedure of Example 4, with the following modifications:

Part V

α-d-1,2-diphenyl-2-propionoxy-3-methyl-4-dimethylaminobutane 2-naphthalenesulfonate _____g__ 10.0

Part VII

F.D. and C. Yellow No. 5 _____g__ 0.10
Water, distilled _____ml__ 10.0

Parts VIII and IX

Ethanol, 95 percent _____ml__ 10.5
Methyl parahydroxybenzoate _____g__ 0.3
Propyl parahydroxybenzoate _____g__ 0.15
Butyl parahydroxybenzoate _____g__ 0.15
Lemon-lime flavor, imitation _____ml__ 0.3

The completed suspension has a pleasant citrus flavor of excellent acceptability in taste-panel tests.

I claim:

1. The 2-naphthalenesulfonate salt of a compound selected from the group consisting of the α-d and α-l forms of a base represented by the formula

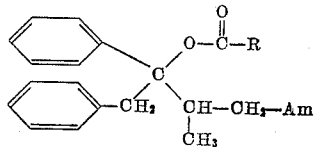

wherein R represents a radical of the group consisting of methyl and ethyl, and Am represents a radical of the group consisting of dimethylamino, dimethylamino-N-oxide, pyrrolidino, and pyrrolidino-N-oxide.

2. α-l-1,2-diphenyl-2-propionoxy-3-methyl-4-dimethylaminobutane 2-naphthalenesulfonate.

3. α-l-1,2-diphenyl-2-propionoxy-3-methyl-4-dimethylaminobutane-N-oxide 2-naphthalenesulfonate.

4. α-d-1,2-diphenyl-2-propionoxy-3-methyl-4-dimethylaminobutane 2-naphthalenesulfonate.

5. α-d-1,2-diphenyl-2-propionoxy-3-methyl-4-dimethylaminobutane-N-oxide 2-naphthalenesulfonate.

References Cited in the file of this patent

UNITED STATES PATENTS

| | | |
|---|---|---|
| 2,728,779 | Pohland | Dec. 27, 1955 |
| 2,731,493 | Aeschliman et al. | Jan. 17, 1956 |
| 2,820,817 | Sam | Jan. 21, 1958 |
| 2,862,968 | Tiffany | Dec. 2, 1958 |

OTHER REFERENCES

Brewster: "Organic Chemistry," 2nd ed., Prentice-Hall, Inc., 1953, page 692.